United States Patent [19]
Bryson et al.

[11] Patent Number: 5,943,227
[45] Date of Patent: Aug. 24, 1999

[54] PROGRAMMABLE SYNCHRONOUS STEP DOWN DC-DC CONVERTER CONTROLLER

[75] Inventors: Stephen W. Bryson, Cupertino; Tony Wong, San Jose; Brian C. Lombard, Sunnyvale, all of Calif.

[73] Assignee: Fairchild Semiconductor Corporation, South Portland, Me.

[21] Appl. No.: 08/672,487

[22] Filed: Jun. 26, 1996

[51] Int. Cl.⁶ .............................. H02M 3/24; G05F 1/40
[52] U.S. Cl. .............................. 363/95; 363/78; 323/283
[58] Field of Search ............................. 363/95, 46, 41, 363/56, 78; 323/312, 317, 283, 224, 235, 222

[56] References Cited

U.S. PATENT DOCUMENTS

| | | | |
|---|---|---|---|
| 4,335,445 | 6/1982 | Nercessian | 363/78 |
| 4,761,725 | 8/1988 | Henze | 323/283 |
| 5,028,861 | 7/1991 | Pace et al. | 323/222 |
| 5,079,498 | 1/1992 | Cleasby et al. | 323/283 |
| 5,162,631 | 11/1992 | Hachisuka et al. | 219/69.13 |
| 5,432,693 | 7/1995 | Anderson | 323/283 |
| 5,479,089 | 12/1995 | Lee | 323/283 |
| 5,671,149 | 9/1997 | Brown | 364/483 |
| 5,675,240 | 10/1997 | Fujisawa et al. | 323/282 |

*Primary Examiner*—Peter S. Wong
*Assistant Examiner*—Rajnikant B. Patel
*Attorney, Agent, or Firm*—Skjerven, Morrill, MacPerson, Franklin & Friel LLP; Michael J. Halbert

[57] ABSTRACT

An monolithic programmable dc—dc converter controller integrated circuit with a high speed synchronous controller and a 4-bit programmable DAC to provide an operating voltage to an external device such as a microprocessor in response to a code programmed in the external device. The 4-bit programmable DAC outputs a signal which is combined with a precise reference voltage to provide voltages to the external device in increments of 100 millivolts.

11 Claims, 2 Drawing Sheets

PROGRAMMABLE SYNCHRONOUS STEP DOWN DC-DC CONVERTER CONTROLLER

BACKGROUND OF THE INVENTION

1. Field of the Invention

This invention relates generally to programmable power supplies and, more specifically, to a programmable synchronous step down dc—dc converter controller and, even more specifically, to a programmable synchronous step down dc—dc converter controller suitable for use in current and future computer systems in which the CPU in the computer system is programmed to signal the controller what voltage is required and wherein the controller automatically supplies the required voltage.

2. Discussion of the Related Art

In the past ten years, the microprocessor has evolved from an integrated semiconductor chip that could control only simple functions to something that can rival the computing power of a mainframe computer. That evolution has brought ever increasing numbers of transistors being integrated onto a single chip and, as an example, the current Intel Pentium® microprocessor chip integrates well over 5 million transistors on a single piece of silicon. Other microprocessor chip manufacturers integrate similar numbers of transistors on their chips. In order to achieve this kind of density, the physical geometry of each transistor has had to be reduced to the sub-micron level and with each successive design geometry shrink, the corresponding maximum voltage within which the transistor is to operate has had to be reduced as well. This changing maximum operating voltage for microprocessors has led to the need for a programmable power supply such that with each successive change in voltage requirement for microprocessors the system designer will not have to completely re-engineer the power supply system. The voltage requirements of the microprocessor has been trending downwards over approximately the past 5 years, from 5 volts for the 386 and 486 microprocessors, to 3.3 volts for the Pentium, and now to down to 3.1 volts for the Pentium Pro®. There are indications that operating voltages for 1997 era microprocessors will be in the range of 2.5 volts.

Previous generations of dc—dc converter controllers have been designed with fixed output voltages or, in some cases, they have been adjustable by changing a set of external resistors. In the existing high volume production environment for personal computers, the central processing unit (CPU) board (also known as a "motherboard") has had to be redesigned each time the operating voltage has been changed by the microprocessor manufacturer. To address the problems caused by the changing voltage requirements, Intel®, has programmed a voltage identification code (VID) into the Pentium Pro CPU which can be read by a motherboard that has the appropriate read capability. The motherboard, if it has the function built-in, then supplies the voltage identified by the VID to the CPU. This eliminates the requirement of the system designer to redesign the motherboard each time the CPU voltage changes because the CPU signals its own required voltage and the controller then automatically supplies the required voltage.

What is needed is a dc—dc converter controller designed with the ability to be programmed to address the changing power supply voltage needs for future lower voltage microprocessors. The dc—dc converter controller must be able to read the VID code programmed into the microprocessor and then supply the voltage called for by the microprocessor.

SUMMARY OF THE INVENTION

According to the present invention, an integrated monolithic programmable dc—dc converter controller provides an output voltage called for by a digital input from an external device. The controller includes at least one amplifier to provide the required voltage, a control unit to control the magnitude of the output of the amplifier, and a circuit responsive to the digital input.

The circuit also includes a digital to analog converter which receives the digital input from an external device such as a microprocessor.

The digital to analog converter adds a signal to a precise reference signal which causes the output voltage to be at the required voltage. The output voltage delivered to the microprocessor can be selected by the microprocessor in increments of 100 millivolts.

The present invention is better understood upon consideration of the detailed description below, in conjunction with the accompanying drawings. As will become readily apparent to those skilled in this art from the following description there is shown and described an embodiment of this invention simply by way of illustration of the best mode to carry out the invention. As will be realized, the invention is capable of other modifications in various obvious aspects, all without departing from the scope of the invention. Accordingly, the drawings and detailed description will be regarded as illustrative in nature and not as restrictive.

BRIEF DESCRIPTION OF THE DRAWINGS

The accompanying drawings incorporated in and forming a part of the specification, illustrate the present invention, and together with the detailed description below serve to explain the principles of the invention. In the drawings.

DETAILED DESCRIPTION

Figure 1:
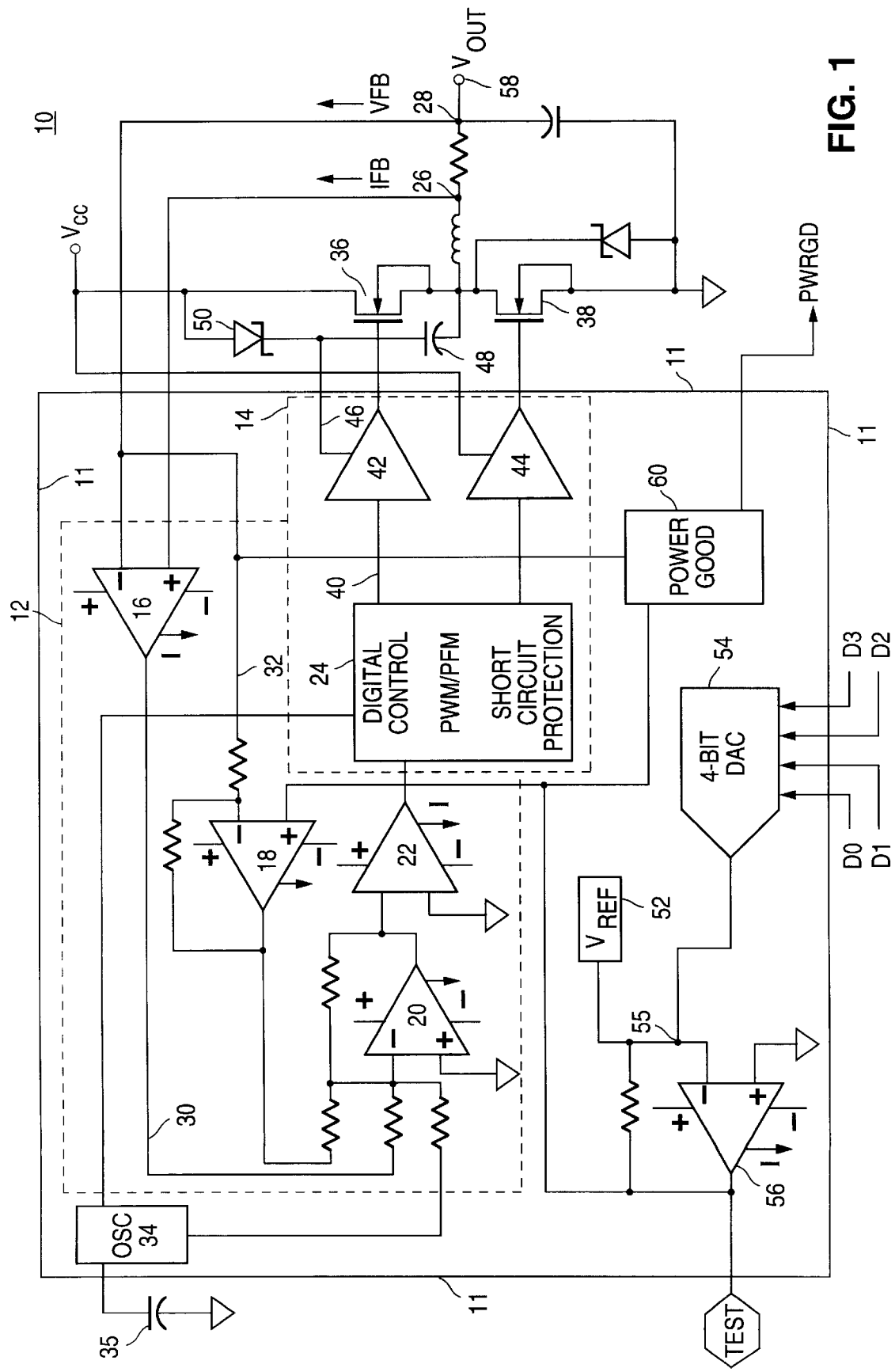
FIG. 1 is a block diagram of the programmable dc—dc converter controller of the present invention.

In the following description, for purposes of clarity and conciseness of the description, not all of the numerous components shown in the schematic are described. The numerous components are shown in the drawings to provide a person of ordinary skill in the art a thorough enabling disclosure of the present invention. It will be apparent to one skilled in the art that a detailed description of all of the specific components is not required in order for one of ordinary skill in the art to practice the present invention. Therefore, only those components that are affected by the present invention or that are necessary for an understanding of the present invention are shown in the figures and discussed. In addition, well known electrical structures and circuits are shown in block diagram form in order to not obscure the present invention unnecessarily.

The present invention is a programmable synchronous voltage controller and when designed around appropriate components can be configured to deliver in excess of 12 amperes of output current. During heavy loading conditions, the controller functions as a current-mode PWM (pulse width modulation) step down regulator. Under light loads, the regulator functions in the PFM (pulse frequency modulation) or pulse skipping mode. The controller senses the load level and switches between the two operating modes automatically, thus optimizing its efficiency under all loading conditions.

Referring now to FIG. 1, there is shown the monolithic programmable dc—dc converter controller 10 of the present invention. The portion of controller 10 shown within solid line 11 is manufactured on a single semiconductor chip. The controller 10 includes a main control loop which contains two main sections; an analog control block delineated by dashed lines at 12 and a digital control block delineated by dashed lines at 14. Analog block 12 comprises signal conditioning amplifiers 16, 18, and 20 which feed into comparator 22 which provides an input into digital control 24. The analog block 12 accepts inputs from the IFB (current feedback) pin at 26 and the VFB (voltage feedback) pin at 28 and establishes a current controlling signal path 30 and a voltage controlling signal path 32. The voltage controlling path 32 amplifies the VFB signal which is input to signal conditioning amplifier 20. Signal conditioning amplifier 16 determines the difference between the signal at the IFB pin 26 and the signal at the VFB pin 28 which is input to signal conditioning amplifier 20. The amplified VFB signal and the difference signal between the VFB and IFB signals are summed together with a slope compensation input from oscillator 34 and input into signal conditioning amplifier 20. The output from signal conditioning amplifier 20 is input to comparator 22 which provides the main PWM control signal to digital control 24. Additional comparators (not shown) in the analog control block 12 set the thresholds where the controller 10 enters a pulse skipping mode during light loads as well as the point at which a maximum current comparator (not shown) disables the output drive signals to the external power MOSFETs, 36 and 38. The digital control 24 takes the comparator input and a main clock signal from oscillator 34 and provides the appropriate pulses to the HIDRIV output 40 that controls the external power MOSFET 36. The digital control block 14 utilizes high speed schottky transistor logic allowing the controller 10 to operate at clock speeds in excess of 1 MHz. The digital control block 14 also provides the break-before-make timing that ensures both external MOSFETs 36 and 38 are not on at the same time. Oscillator 34 is a fixed current capacitor charging oscillator. An external capacitor 35 allows for maximum flexibility in choosing the associated external components for the application circuit. Oscillator 34 frequency can be set from less than 200 KHz to over 1 MHz depending upon the application requirements.

The digital control block 14 contains two identical high current output drivers 42 and 44 which utilize high speed bipolar transistors (not shown) arranged in a push-pull configuration. Each driver is capable of delivering 1 ampere of current in less than 100 nanoseconds. Each driver's power and ground are separated from the overall chip power and ground to provide for switching noise immunity. The HIDRV driver 42 has a power supply which is boot-strapped from a flying capacitor 48. In this configuration, capacitor 48 is alternately charged from $V_{CC}$ via the schottky diode 50 and then boosted up when MOSFET 36 is turned on. This scheme provides a voltage at 46 equal to $2*(V_{CC}-V_{ds})$ (diode 50) which is approximately 9.5 V with $V_{CC}$=5 V. This voltage is sufficient to provide the 9 V gate drive to the external MOSFET 36 required in order to achieve a low $R_{DS,ON}$ (resistance-drain to source,on). Since the low side synchronous MOSFET 38 is referenced to ground, its gate drive voltage does not need to be boosted and its power pin can be tied directly to $V_{CC}$.

The controller 10 is referenced to a reference $V_{REF}$ 52 which is a precision band-gap voltage reference. The internal resistors (not shown) in the voltage reference are precisely trimmed to provide a near zero temperature coefficient (TC). Added to the output of $V_{REF}$ is the output from an integrated 4-bit DAC 54. The DAC is supplied with inputs which specify a value to be added to $V_{REF}$ which will result in the required output voltage at $V_{OUT}$ 58. For example, the Pentium Pro specification guideline, requires the dc—dc converter output to be directly programmable via a 4-bit voltage identification (VID) code shown in Table I below. This code will scale the reference voltage $V_{REF}$ from its value, which in a typical case is 2.0 V, to 3.5 V in 100 millivolt increments.

TABLE I

VID Codes for Pentium Pro ™

| Data Bits | | | | |
|---|---|---|---|---|
| D3 | D2 | D1 | D0 | $V_{REF}$ |
| 1 | 1 | 1 | 1 | 2.0 |
| 1 | 1 | 1 | 0 | 2.1 |
| 1 | 1 | 0 | 1 | 2.2 |
| 1 | 1 | 0 | 0 | 2.3 |
| 1 | 0 | 1 | 1 | 2.4 |
| 1 | 0 | 1 | 0 | 2.5 |
| 1 | 0 | 0 | 1 | 2.6 |
| 1 | 0 | 0 | 0 | 2.7 |
| 0 | 1 | 1 | 1 | 2.8 |
| 0 | 1 | 1 | 0 | 2.9 |
| 0 | 1 | 0 | 1 | 3.0 |
| 0 | 1 | 0 | 0 | 3.1 |
| 0 | 0 | 1 | 1 | 3.2 |
| 0 | 0 | 1 | 0 | 3.3 |
| 0 | 0 | 0 | 1 | 3.4 |
| 0 | 0 | 0 | 0 | 3.5 |

The codes shown in Table I are used as follows. The designer of a microprocessor chip, in this example the Pentium Pro, determines that the microprocessor that has been designed is to operate at 2.8 volts. The Data Bit code for 2.8 volts (0111) is programmed into the microprocessor and is read as an input by DAC 54 contained in the programmable synchronous step down dc—dc converter controller 10. DAC 54 then provides an output 55 which is combined with $V_{REF}$ which is input to amplifier 56. The output of amplifier 56 is input to amplifier 18 which is part of analog block 12, and as described above, an output of analog block 12 is input to digital control 24 which, in turn, will cause the requested voltage (2.8 volts) to be output at $V_{OUT}$ 58. For stable operation under all loading conditions, a 10 K ohm pull-up resistor and a 0.2 microfarad decoupling capacitor (not shown) can be connected to $V_{REF}$.

The controller 10 includes a power good circuit 60 which provides a constant voltage monitor on the VFB pin 28 (which is also $V_{OUT}$). Power good circuit 60 compares the signal at the VFB pin 28 to the $V_{REF}$ signal and outputs an active-low interrupt signal to the CPU should the power supply voltage (at $V_{OUT}$ 58) exceed a selected percentage, for example, ±7% of its nominal setpoint.

Figure 2:
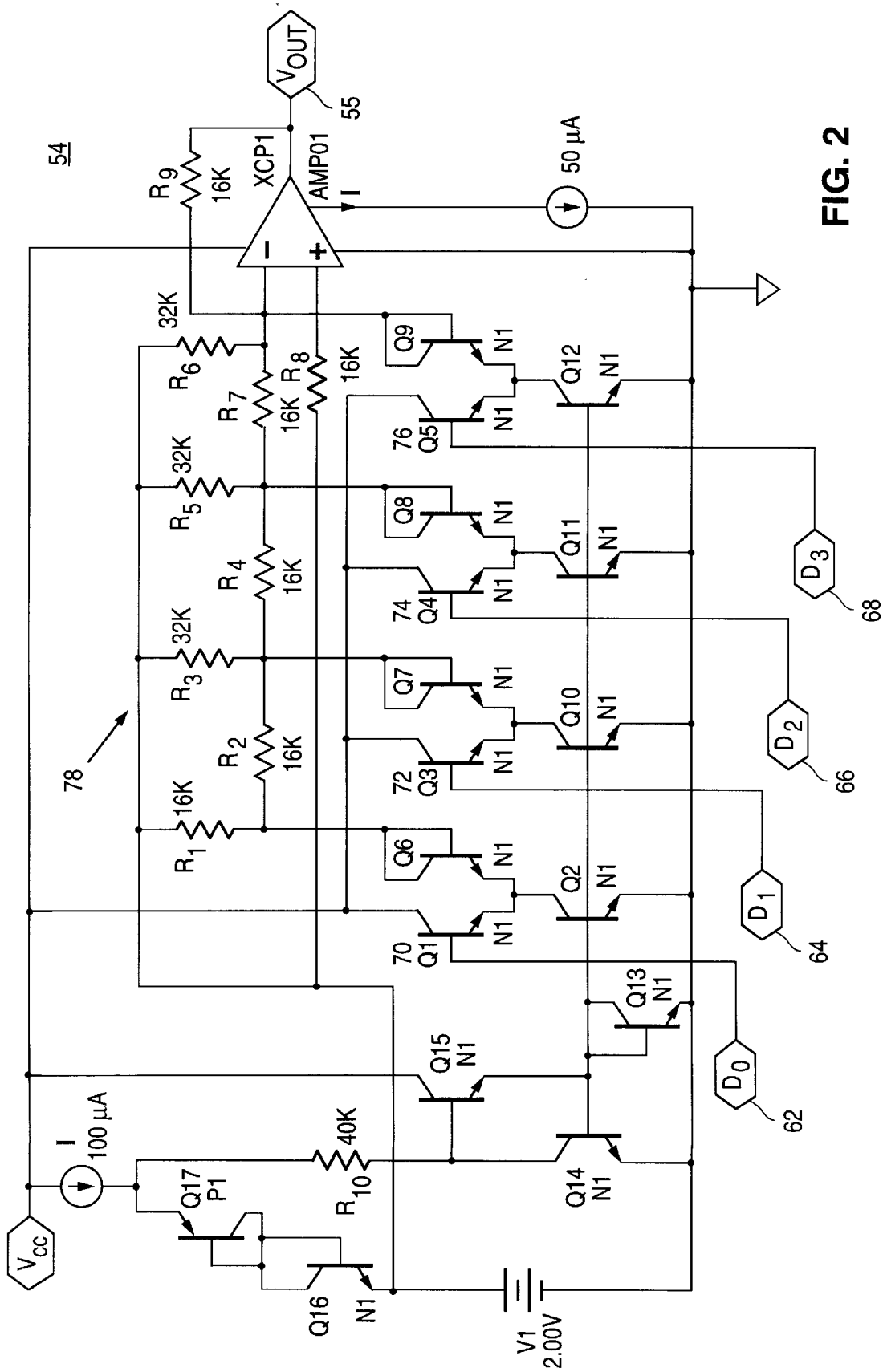
FIG. 2 is schematic of the digital to analog converter as used in the present invention.

Referring now to FIG. 2 there is shown a schematic of DAC 54. It is to be understood that the DAC shown in FIG. 2 is representative of a number of digital to analog converters that could be used in the present invention. The inputs 62 ($D_0$), 64 ($D_1$), 66 ($D_2$), and 68 ($D_3$) correspond to the programmed inputs shown in Table I above and are received from an external device such as a microprocessor. These inputs either turn on or turn off transistors 70, 72, 74, and 76 respectively. The resistive ladder, which is known as an R-2R resistive ladder, indicated at 78, provides an incremented voltage at $V_{OUT}$ 55 depending upon the values of inputs 62, 64, 66, and 68, and as discussed above, the increment in this example is 100 millivolts.

The foregoing description of the preferred embodiment of the present invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What we claim is:

1. A monolithic programmable dc—dc converter controller, comprising:

at least one amplifier having an analog output signal;

a control unit producing a control signal to said at least one amplifier to control a magnitude of the analog output signal of said at least one amplifier;

a circuit responsive to a digital input signal, said circuit producing an analog output signal to said control unit specifying the magnitude of the analog output signal of said at least one amplifier; and wherein said digital input signal is from an external device specifying a voltage required by said external device and said circuit converts said digital input signal to said analog output signal.

2. The monolithic programmable dc—dc converter controller of claim 1, wherein said circuit comprises a digital to analog converter.

3. The monolithic programmable dc—dc converter controller of claim 2, wherein said second analog output signal comprises said output signal to said control unit specifying the magnitude of the analog output signal of said at least one amplifier.

4. The monolithic programmable dc—dc converter controller of claim 3, wherein said second analog output signal of said digital to analog converter is combined with a reference voltage to provide an output signal to said control unit wherein said output signal is determined by said reference voltage plus a voltage specified by said digital input signal.

5. The monolithic programmable dc—dc converter controller of claim 4, wherein said voltage specified by said digital input signal is determined by a value of said digital input signal multiplied by a selected voltage increment.

6. The monolithic programmable dc—dc converter controller of claim 5, wherein said external device specifies a required voltage in selected increments.

7. The monolithic programmable dc—dc converter controller of claim 6, wherein said external device comprises a microprocessor.

8. The monolithic programmable dc—dc converter controller of claim 7, wherein said selected voltage increment is 100 mV.

9. The monolithic programmable dc—dc converter controller of claim 8, wherein said at least one amplifier, said control unit, and said circuit are integrated on a single semiconductor chip.

10. A monolithic programmable dc—dc converter controller comprising:

at least one amplifier having an input terminal and an output terminal, said at least one amplifier producing an analog output signal on said output terminal;

a control unit having an input terminal and an output terminal, said output terminal of said control unit coupled to said input terminal of said at least one amplifier, said control unit producing a control signal on said output terminal of said control unit controlling the magnitude of said analog output signal on said output terminal of said at least one amplifier; and a circuit having at least one input terminal and an output terminal, said output terminal of said circuit coupled to said input terminal of said control unit, said at least one input terminal of said circuit coupled to an external device, wherein said external device provides a digital input signal on said input terminal of said circuit specifying a voltage required by said external device, said circuit producing an output signal on said output terminal of said circuit specifying said magnitude of said analog output signal on said output terminal of said at least one amplifier.

11. The monolithic programmable dc—dc converter controller of claim 10, wherein said circuit has four input terminals coupled to said external device, each of said four input terminals receiving a digital input signal from said external device.

* * * * *

UNITED STATES PATENT AND TRADEMARK OFFICE
CERTIFICATE OF CORRECTION

PATENT NO.    : 5,943,227
DATED         : August 24, 1999
INVENTOR(S)   : Stephen W. Bryson, Tony Wong and Brian C. Lombard It is certified that error appears in the above-identified patent and that said Letters Patent is hereby corrected as shown below:

Title page,
ABSTRACT,
Please replace the Abstract as follows:
   A monolithic programmable dc—dc converter controller integrated circuit with a high speed synchronous controller and a 4-bit programmable DAC to provide an operating voltage to an external device such as a microprocessor in response to a code programmed in the external device. The 4-bit programmable DAC outputs a signal which is combined with a precise reference voltage to provide voltages to the external device in increments of 100 millivolts.

Column 1,
Line 15, replace the paragraph, with the following paragraph:
   -- In the past ten years, the microprocessor has evolved from an intergrated semiconductor chip that could control only simple funtions to something that can rival the computing power of a mainframe computer. That evolution has brought ever increasing numbers of transistors being integrated onto a single chip and, as an example, the current Intel Pentium® microprocessor chip integrates well over 5 million transistors on a single piece of silicon. Other microprocessor chip manufacturers integrate similar numbers of transistors on their chips. In order to achieve this kind of density, the physical geometry of each transistor has had to be reduced to the sub-micron level and with each successive design geometry shrink, the corresponding maximum voltage within which the transistor is to operate has had to be reduced as well. This changing maximum operating voltage for microprocessors has led to the need for a programmable power supply such that with each successive change in voltage requirement for microprocessors the system designer will not have to completely re-engineer the power supply system.

UNITED STATES PATENT AND TRADEMARK OFFICE
CERTIFICATE OF CORRECTION

PATENT NO.   : 5,943,227
DATED        : August 24, 1999
INVENTOR(S)  : Stephen W. Bryson, Tony Wong and Brian C. Lombard It is certified that error appears in the above-identified patent and that said Letters Patent is hereby corrected as shown below:

<u>Column 1 con't,</u>
The voltage requirements of the microprocessor has been trending downwards over approximately the past 5 years, from 5 volts for the 386 and 486 microprocessors, to 3.3 volts for the Pentium, and now down to 3.1 volts for the Pentium Pro®. There are indications that operating voltages for 1997 era microprocessors will be in the range of 2.5 volts.

Signed and Sealed this

Ninth Day of July, 2002

*Attest:*

JAMES E. ROGAN
*Director of the United States Patent and Trademark Office*

*Attesting Officer*